April 25, 1967 P. LEMS 3,315,592
METHOD OF AND APPARATUS FOR TIGHTENING AND STRAPPING
INVOLUTELY WOUND SHEET METAL COILS
Filed Oct. 14, 1965 6 Sheets-Sheet 1

INVENTOR
Peter Lems

BY Edward R. Lowndes

FIG. 2

INVENTOR
Peter Lems

BY Edward R. Lowndes

INVENTOR
Peter Lems
BY Edward R. Lowndes

April 25, 1967

P. LEMS 3,315,592

METHOD OF AND APPARATUS FOR TIGHTENING AND STRAPPING
INVOLUTELY WOUND SHEET METAL COILS

Filed Oct. 14, 1965

INVENTOR
Peter Lems

BY Edward R. Lowndes

FIG. 11

INVENTOR:
PETER LEMS
By: Edward R. Lowndes

INVENTOR:
PETER LEMS
BY Edward R. Lowndes

United States Patent Office 3,315,592
Patented Apr. 25, 1967

3,315,592
METHOD OF AND APPARATUS FOR TIGHTENING AND STRAPPING INVOLUTELY WOUND SHEET METAL COILS
Peter Lems, Wilmette, Ill., assignor to Signode Corporation, Chicago, Ill., a corporation of Delaware
Filed Oct. 14, 1965, Ser. No. 495,931
16 Claims. (Cl. 100—3)

The present invention relates to a method of and apparatus for applying a strap to an involutely wound sheet metal coil (commonly known as a strip coil) at the strapping station of a strapping machine, and, simultaneously with the strapping operation, tightening the coil convolutions so that the adjacent convolutions of the completely strapped coil will be in intimate contiguity, thus in effect rendering the coil "solid." In the illustrative embodiments of the invention disclosed herein, the strapping which is applied to the coil is, during the strap-tensioning operation, caused to effect the coil tightening operation. It is to be distinctly understood, however, that in its broadest aspect the coil tightening mechanism associated with the present invention may be employed solely for coil tightening purposes and the strapping operation performed separately with the strap being applied to the coil at a region longitudinally removed from the tightening mechanism.

Heretofore, considerable difficulty has been encountered in the effective machine-strapping of relatively massive strip coils at a strapping station due to the fact that the outermost few convolutions of the coils are not tight. The problem is particularly acute where hot coils are delivered to a strapping station direct from the rolling mill and in such condition that they cannot conveniently be handled. Although the inner convolutions of such coils may be tight, invariably the last few outermost coil convolutions are loose due to the normal tendency of the coils to unwind. Such unwinding of the coil may be enhanced by the joggling action of the conveyor on which the coils are transported from the rolling mill to the strapping station but, in any event, the circumferential shifting of the sheet material which is necessary to effectively tighten the coil convolutions is invariably greater than the slight amount of such shifting which takes place when conventional strapping operations are performed on the coil and which are a function of only the elongation factor of the strapping during tensioning thereof, coupled with a slight degree of convolution slippage or settling. Thus, where a coil in which the convolutions thereof are not altogether tight is concerned, the conventional application of a strap thereto may serve to bind the extreme outermost coil convolution to the next adjacent convolution or, at the most, to bind the three outermost convlutions to one another. However, these outermost convolutions are not tightly bound to the remaining inner convolutions so that when the strap has been severed and the conveyor transports the coil away from the strapping station, the joggling motion of the conveyor will cause an inward unwinding of these outer convolutions, so to speak, and a condition of equilibrium will obtain where the tightness of these outer convolutions will be dissipated radially back into the coil and the applied strap will become loose and fall to the bottom rim of the coil. Subsequently, when the coil is lifted by a conventional coil grab, the coil will shed its strap and be transported in an unstrapped condition.

Various methods of coil tightening have heretofore been attempted and employed both preparatory to and in conjunction with the coil strapping operation. Each of these has, however, been possessed of certain limitations. Coil lubrication and coil vibration in an effort to cause natural settling of the coil convolutions during the strap tensioning operation has proven effective only where extremely small coils are concerned, where coil temperatures are relatively low, and where smooth sheet metal surfaces are involved, as for example cold rolled stainless steel, and similar materials having low coefficients of friction. Obviously such a method is impractical where strip coils are concerned, especially when the coils are hot.

Where strapping is accomplished by means of a hand tool, it has been possible to attain a reasonable degree of coil tightness by pulling the tool bodily in a circumferential tightening direction during the strap tensioning operation. This requires a considerable degree of skill and it is impractical in connection with the tghtening of relatively massive coils weighing, for example on the order of fifty thousand pounds. Furthermore, hand tool strapping is precluded where hot strip coils are concerned.

Where automatic strapping machine operations are concerned, coil tightening has been effected by bodily turning the entire strapping machine in a coil-tightening direction about the central axis of the coil at such time as the strap has been tensioned about the coil and before the seal has been applied or the strap severed. The tensioned strap will thus, due to friction, carry the outermost coil convolution, with which it is in intimate contact, in a coil tightening direction so that, when the coil is fully tightened, the strap, still tensioned, may then be severed. Such a procedure is possessed of numerous limitations from the point of view of both machine design and machine function.

Insofar as machine design is concerned, the provision of arcuate guide rails or tracks for oscillation of the strapping machine and of power equipment for effecting machine oscillation is costly and, furthermore, a given strapping machine is incapable of effectively operating upon coils which vary appreciably in diameter. Thus, each machine must be designed for the strapping of coils having a specified diameter. For example, where such a machine is put to use in the strapping of a coil of lesser diameter than that for which the machine is intended, the strapping head will travel in a curved path of large radius and which is tangential to the cylindrical surface of the coil and thus pull the tensioned strap loop away from the coil in the immediate vicinity of the strapping head, thereby exposing a limited area of the outermost coil convolution which is then free to buckle outwardly away from the next adjacent inner coil convolution. When tensioning of the strap has been completed and the strap is finally severed, the material of the buckle will dissipate itself back into the inner regions of the coil, thus reestablishing a condition of coil looseness. Another limitation that is attendant upon such bodily rotation of the strapping machine resides in the fact that careful control of the rate of turning movement of the strapping machine must be exerted to prevent the strap from travelling faster than the outermost coil convolution. When such a condition occurs, the shrinkage in the over-all diameter of the coil incident to tightening of the coil will loosen the strap beyond the ability of the tensioning rollers to maintain strap tightness and the strap will tend to slip upon the coil rather than to frictionally engage it for coil-tightening purposes as intended. The net effect of this is to bring the machine to the end of its arcuate stroke before the coil has become fully tightened. In some instances, even when careful control of the rate of turning movement of the strapping machine is resorted to, the machine will reach the end of its arcuate stroke before the coil has been fully tightened, this being due to the existence of a coil which is unduly loose at the outset and in which the amount of winding necessary to tighten the coil, i.e. the linear extent of circumferential travel of the free edge of the coil, is in excess of the arcuate travel of which the strapping head is capable. In such an instance it is necessary to return the strapping machine to its original position to obtain a new "bite" upon the coil, so to speak, for a second or succeeding tightening operation. During such return of the strapping machine, it is necessary to retain the coil tension gained during the first tightening operation and, for this purpose, coil-engaging pressure means is required. It also is necessary to release the tensioning mechanism from the strap during the return stroke of the machine and to reapply it during the second stroke of the machine. The performance of such extraneous functions requires costly adjuncts to the strapping machine equipment and costly control mechanism for correlating the functioning thereof. It will be appreciated of course that practical considerations limit the degree of angular turning movement of which a strapping machine is capable to an amplitude on the order of ten or twelve degrees at the most, falling within acceptable limits of machine oscillation.

The present invention is designed to overcome the above-noted limitations that are attendant upon the construction and operation of conventional coil tightening apparatus and, toward this end, the invention contemplates the provision of a novel method and apparatus by means of which the outer loose convolutions of a coil undergoing strapping may be tightened, utilizing a conventional strapping machine for strap feeding, tensioning, sealing and severing operations in the usual manner of operation of such a machine, but without necessitating relative bodily turning movement between the coil undergoing strapping and the machine as a whole. According to the present invention, coil tightening takes place during the actual tensioning operation, the usual tensioning or feed rollers being employed for tensioning purposes. However, in order to shift the outermost coil convolution in a circumferential tightening direction during the tensioning operation, a substantial arcuate extent of the strap is initially drawn into intimate frictional contact with the outermost coil convolution by a partial tensioning operation and then it is shifted bodily endwise to draw such convolution in a coil-tightening direction. An excess of strapping is provided in the strap loop which is initially wrapped around the coil and shifting of the partially tensioned portion of the loop is made possible by drawing the strap from such excess portion progressively so that as the strap moves tangentially away from the coil and progresses toward the tensioning rollers adjacent one end of the loop, it enters the loop tangentially from the excess portion adjacent the other end of the latter much in the manner of a belt passing over a sheave or pulley. Tension in the wrapped portion of the strap is maintained during this endwise shifting thereof so that the slight decrease in the diameter of the coil incident to coil tightening is compensated for and good frictional contact is maintained between the strap and coil throughout the tightening operation.

Ample excess strapping is provided to allow complete coil tightening and, when this takes place, slippage of the wrapped portion of the strap on the now tight outer coil convolution occurs and any remaining portion of the excess strapping is drawn into the wrapped portion of the strap, whereupon continued tensioning tightens the loop of strapping about the tightened coil in the usual manner of package-binding, after which a seal may be applied to the overlapping ends of the loop and the strap severed from the coil.

An advantageous feature of the present invention resides in the fact that the entire strapping machine is floatingly mounted for movement bodily toward and away from the coil at the strapping station so that during the tensioning operation the tension which is imparted to the encircling loop of strapping, both during the preliminary coil tightening phase and the final binding phase draws the strapping head into intimate contact with the coil. A similar and related feature of the invention resides in the provision of a storage space or "reservoir" for the excess strapping which also is independently floatingly disposed with respect to both the strapping head and the coil so that the tension in the loop of strapping will also draw such reservoir of strapping into close proximity to the coil whereby the strap, as it is drawn from the reservoir, will substantially immediately flow into the coil loop in intimate contact with the outer coil convolution for friction driving purposes, thus constantly applying increments of frictional torque to such coil convolution to compensate for the increments which are removed therefrom as the strapping of the loop flows tangentially away from the coil in moving toward the tensioning rollers. By such an arrangement, the apparatus is capable of automatically adjusting itself to coils of varying over-all diameter so that during the coil tensioning phase the coil is completely encircled by the loop of strapping which exerts its centripetal force on the coil throughout the entire 360° circumferential extent thereof and leaves no unsupported void where there otherwise would be an opportunity for the sheet metal of the coil to buckle as previously described in connection with strapping heads of the oscillatory type. Furthermore, with both a floating strapping head and a floating reservoir for the excess strapping, the centripetal force exerted by the loop undergoing tensioning is maintained effective at all times despite the decrease in coil diameter incident to coil tightening.

In the illustrated forms of the invention, fully automatic apparatus for effecting simultaneous coil tightening and coil strapping operations have been employed. Such apparatus may be designed as original equipment in connection with a coil strapping machine or it may be readily applied to existing machines. In either event, no radical departures from conventional strapping machine design or operation or from conventional coil handling equipment is involved. The coils may be successively brought to the strapping station in the usual manner on a live roll or other conveyor and, after coil tightening and strapping operations have been completed, they may be similarly transported from the strapping station to a transfer station where the bound coils may be removed by a suspension coil grab or the like with no danger of the coils shedding their straps.

The method briefly outlined above is capable of being carried out by a wide variety of mechanism but, in general, it may be accomplished in only two ways. Either the excess strapping which is relied upon to allow for circumferential shifting of the wrapped portion of the strap must be disposed along the path of strap movement between the tensioning rollers or other tensioning means and the reaction clamp for the free end portion of the strap, or it must be disposed on the side of the reaction clamp remote from the tensioning rollers. Novel means for conducting the method of the present invention in each of these two ways has been illustrated, the former way being the preferred one. It will be understood however that the illustrated means are by way of example and not of limitation and that other means than those illustrated are contemplated within the purview of the present invention.

The provision of a coil tightening and strapping method and apparatus such as has briefly been outlined above constituting the principal object of the invention, numerous other objects and advantages of the invention will readily suggest themselves as the nature of the invention is better understood.

In the accompanying six sheets of drawings forming a part of this specification, two illustrative embodiments of the invention have been shown.

In these drawings.

Referring now to the drawings in detail, a preferred method of tightening a coil by passing a flexible band or strap about the coil and thereafter manipulating the band so that it will frictionally engage the outermost loose coil convolution and draw the same in a circumferential coil-tightening direction until all of the coil convolutions are tight has been schematically illustrated in FIGS. 3 to 6 inclusive. In FIGS. 1, 2 and 7 to 12 inclusive, a fully automatic apparatus by means of which the method shown in FIGS. 3 to 6 inclusive may be carried out has been shown.

In its broadest aspect, the band or strap may be in the form of an elongated length of ribbon-like material or it may be a chain and when it has been manipulated for coil-tightening purposes in a manner that will be described presently and the coil has become tightened, the tightened coil may be separately bound by a commercial strapping machine such as a Signode strapping machine and the coil-tightening band removed. However, in the illustrated form of coil-tightening apparatus, the coil-encircling band is in the form of a steel strap and, after the strap has been manipulated according to the method of the present invention, the overlapping ends thereof are operated upon by a commercial strapping machine, modified acording to the present invention, to apply a seal thereto and to sever the tightened strap from the source of strapping.

It is not essential for an understanding of the present method of coil-tightening that a full understanding of the specific details of the apparatus illustrated in FIGS. 1, 2 and 7 to 12 inclusive be had. The schematic disclosure of FIGS. 3 to 6 inclusive is adequate for descriptive purposes in connection with the method since, in these views, all of the essential elements and instrumentalities for successfully carrying out the method have been disclosed. Furthermore, after the method has been described in terms of the schematic structure illustrated in FIGS. 3 to 6 inclusive and the nature of the method has been ascertained, a more complete understanding of the specific apparatus shown in FIGS. 1, 2 and 7 to 12 inclusive may then be had.

Figure 3:
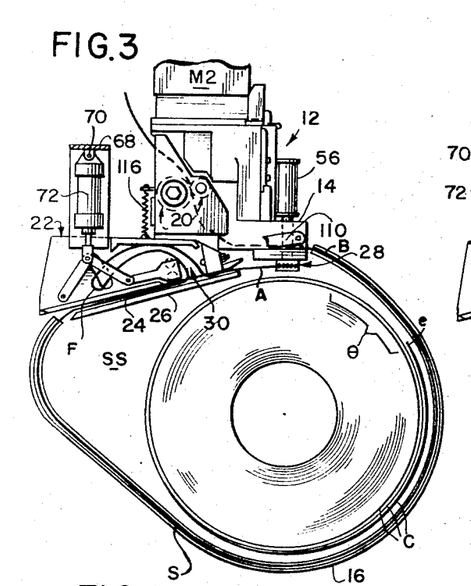
FIG. 3 is a plan view, similar in its outline to FIG. 2 and entirely schematic in its representation, illustrating the condition of the strapping machine at approximately 90° in the machine cycle and after a quantity of excess strapping has been fed into the coil-encircling loop.

Referring now specifically to FIGS. 3 to 6 inclusive and in particular to FIG. 3, an involutely wound coil C of sheet metal which, for purposes of discussion herein may be considered to be a strip coil in the condition which it assumes after it has been transported from the rolling mill to a strapping station, is shown as having its central coil convolutions tightly wound but with the last few outermost convolutions $c$ being loose due to the normal tendency for such a coil to unwind, particularly under the joggling influence of the live conveyor rolls by means of which it is transported from the rolling mill to the strapping station. The normal extent of separation between the adjacent outer convolutions $c$ is not great and it will be understood that if the free edge $e$ of the coil is shifted circumferentially throughout a relatively small arcuate extent, for example one which subtends an angle of approximately 45° as indicated by the bracket O in FIGS. 3 and 4, the coil will become completely tight and all of the convolutions thereof will go "solid." The present method is predicated upon substantially completely encircling the coil C with a strap such as the strap S so as to provide a closed loop of strapping which contains a quantity of material in excess of the circumference of the coil by an amount at least equal to the arcuate extent O and thereafter, with the excess quantity of material isolated outside the circular confines of the loop, and with the remainder of the loop in initmate frictional contact with the outermost coil convolution, causing the loop to be shifted endwise in a coil-tightening direction so as to draw material from the isolated excess quantity of material and feed the same into the circular portion of the loop. By effectively restraining the excess material from entering the closed circular portion of the loop, this portion of the loop is maintained in tight frictional contact with the outer coil convolution so that the outer convolution is constrained to travel in a circumferential path and in a coil-tightening direction until such time as the coil C is completely tight.

In the method illustrated in FIGURES 3 to 6 inclusive, the excess quantity of strapping is caused to assume the form of an auxiliary loop or fold F which is disposed as close as possible to the free or lead end region A of the strap S. Thus, when the feed or supply end region B of the strap is pulled in a tensioning direction as indicated by the arrow in FIGURE 5 and the excess material of the auxiliary loop or fold F is restrained from entering the circular portion of the loop, such increments of strapping as leave the closed circular portion of the loop in the feed end region B thereof will be replaced by corresponding increments of excess strapping which are drawn from the fold F and enter the closed portion of the loop near the free end region A much in the manner of operation of a belt passing over an idler pulley. Tension in the closed portion of the loop will be maintained by the restraint which is applied to the excess strapping tending to retard its dissipation into the closed portion of the loop and the centripetal force thus offered the outer coil convolution is sufficient to afford good frictional contact between the strap and the outermost coil convolution so that the latter will thus be carried circumferentially until all of the loose convolutions c have been tightened.

Figure 1:
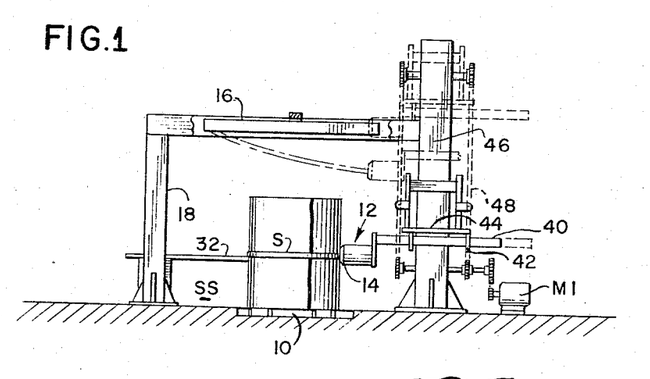
FIG. 1 is a fragmentary side elevational view, somewhat schematic in its representation, showing a preferred form of fully automatic coil tightening and strapping apparatus embodying the principles of the present invention and showing the same operatively disposed at a strapping station and in the condition which it assumes after the strapping operation has been completed but prior to the strap-severing operation.

Considering now the sequential method steps which are illustrated in FIGURES 3 to 6 inclusive, although these steps are susceptible to being carried out manually, they may be more effectively performed by machine operation and in these views when considered in conjunction with FIGURE 1, the essential machine elements necessary for their performance on the basis of a fully automatic apparatus have been illustrated. The apparatus illustrated not only is capable of tightening the coil C but it carries the process one step further and effectively applies a seal to the strap loop and finally severs the tensioned loop from the source of strapping.

In FIGURE 3, the coil C with its loose outer convolutions c may be considered to be supported in an upended condition at a strapping station SS on a suitable support such as the conveyor 10 of FIGURE 1 for cooperation with a vertically shiftable strapping machine 12 which establishes the loop of strapping S as well as the auxiliary loop or fold F, positions the loop, together with the fold, around the coil C, tensions the strapping to shrink the closed portion of the loop upon the coil and thereafter draws excess strapping material from the fold F into intimate contact with the coil for coil-tightening purposes as previously described, and finally applies a seal to the overlapping free end portion A and feed end portion B of the loop and severs the strap to release the coil from the source of strapping.

Various commercial strapping machines having strap feeding, strap tensioning, seal-applying and strap severing instrumentalities associated therewith are available for modification to accomplish the aim of the present invention but the particular machine selected for illustration herein is of the general type shown and described in a United States Patent No. 2,915,003, granted on Dec. 1, 1959 and entitled "Power Strapping Machine." The entire disclosure of such patent, insofar as it is consistent with the present disclosure, is hereby incorporated and made a part of this application by reference thereto. In the present application, however, only such portions of the machine as are pertinent to the present invention have been disclosed, together with the necessary modifications thereof.

The loop of strapping material S is initially established by causing the strapping head 14 of the machine to register with an elevated arcuate strap chute 16 which is supported on a standard 18 above the level of the coil C (FIGS. 1 and 3) and to thereafter feed the strapping S from a suitable source of strapping (not shown) through the chute in the usual manner of strap feeding operations under the impelling influence of a pair of reversible feed rollers 20. One of the principal modifications which is effected upon the strapping machine 12 resides in the provision of a movable carriage assembly 22 which is pivoted to the framework of the strapping machine 12 for swinging movement in a horizontal plane toward and away from the central vertical axis of the coil C and which, in its fully retracted position with the strapping machine 16 elevated, is in operative register with the terminal end of the arcuate strap chute 16 as shown in FIG. 3. The free end region A of the strap 16 which issues from the terminal end of the chute 16 is directed into a guideway 24 which exists between a dual gate structure in the form of a pair of retractible clamshell type gates 26 and the adjacent side of the carriage 22. After this end region has traversed the longitudinal extent of the guideway 24 it passes between a pair of cooperating clamping jaws 28 which immediately close upon the strap and anchor the free end A fixedly in position with respect to the strapping machine framework.

Continued feeding of the strap S through the chute 16 under the influence of the feed rollers 20 now causes a medial region of the strap 16 within the guideway 24 to flow or buckle generally radially outwardly through an open strap-clamping gate structure 30 and gather within the confines of the carriage assembly 22 to form the previously mentioned auxiliary loop or fold F of excess strapping. At such time as the required amount of the strapping material has been forced through the open gate structure 30, strap feeding operations are terminated and the gate structure 30 is caused to become closed upon the auxiliary loop or fold F in such a manner as to frictionally engage the fold at the base region thereof and "pinch" the opposed strap thicknesses together under a predetermined degree of pressure.

At this time, the entire strapping machine 12, together with its horizontally movable carriage assembly 22 is lowered so that the strapping head 14 registers with the desired horizontal plane at which the strap is to be applied to the coil and this lowering of the machine bodily serves to strip or pull the strap loop downwardly from the chute 16 as indicated in broken lines in FIG. 1 so that the loop will encircle the coil C and come to rest upon a suitable grid 32 which, in combination with the strapping machine 12, serves to retain the loose strap in surrounding relation with respect to the coil and at the desired horizontal level.

Figure 4:
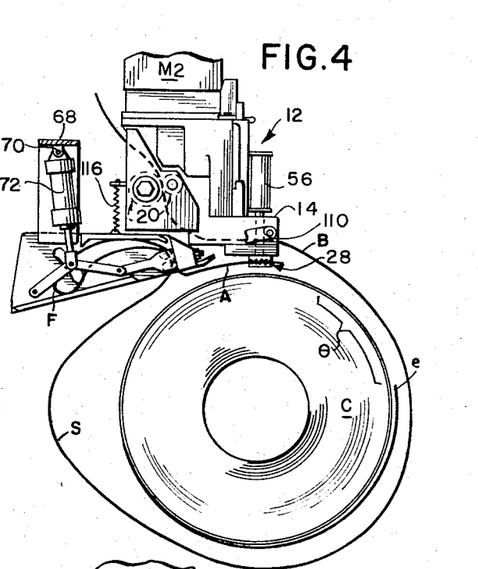
FIG. 4 is a schematic view similar to FIG. 3, showing the machine in the condition which it assumes at approximately 95° in the machine cycle and immediately prior to strap-tensioning operations.

At this time, and with the gate structure 30 frictionally "pinching" the fold F as previously described, the retractible gates 26 are withdrawn from between the loop and the coil so that the condition schematically illustrated in FIG. 4 now obtains. The feed rollers 20 are now driven in a reverse direction so that the feed region B of the strap is progressively drawn between the feed rollers 20 in the usual manner of power strapping machine operation and thus the strap loop is gradually shrunk upon the coil C and the strapping machine 12 is consequently drawn bodily radially inwardly toward the coil. At the same time the horizontally movable carriage 22 is likewise drawn inwardly toward the coil so that the adjacent side thereof comes to rest upon the coil with the gate structure (now closed) in close proximity to the outer coil convolution.

Figure 5:
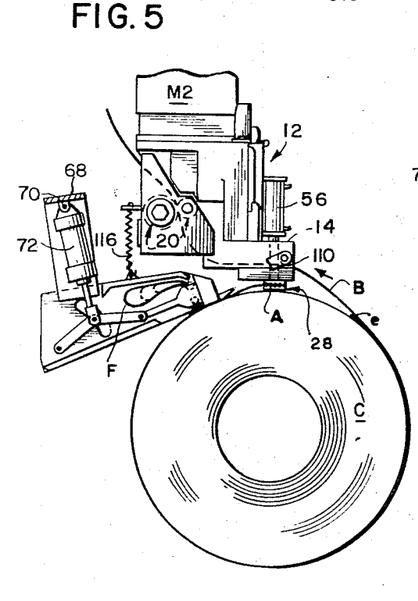
FIG. 5 is a schematic view similar to FIGS. 3 and 4, showing the machine in the condition which it assumes at approximately 180° in the machine cycle and after a quantity of excess strapping has been withdrawn from the coil-encircling loop for coil tightening purposes.

Continued strap tensioning will now cause a circumferential shifting of the closed portion of the strap loop in a coil tightening direction, thus drawing material from the auxiliary loop or fold F of strapping which is stored within the confines of the carriage 22, the friction exerted by the closed gate structure 30 being such that an appreciable centripetal force is exerted upon the outermost convolution sufficient to establish a circumferential drive between the strap loop and such convolution and carry the free edge e of the sheet metal coil in a counterclockwise direction as viewed in FIG. 5, thus gradually tightening the coil.

During this coil-tightening operation, the excess strapping afforded by the fold F gradually diminishes as indicated by the succession of dotted line fold crests in FIG. 5 and, at a point in the machine cycle immediately prior to complete dissipation of the excess strapping material of the fold F, the gate structure 30 is caused to open and release the strapping so that the crease which otherwise would occur during passage of the last trace of the excess strapping through the closed gate structure will be avoided. The small buckle or hump which appears in FIG. 6 and which represents the disappearing fold is rapidly taken up by continued tensioniong of the strap and, at some indeterminate point in the machine cycle (depending upon the extent of initial looseness of the coil, the diameter of the coil, and other factors) the coil will have become fully tightened so that further tensioning of the strap will bind the tightened coil in the usual manner of operation of conventional strapping machines.

With the coil-tightening method of the present invention now completed, the strapping machine 12 may then cause a conventional seal (not shown) to be applied to the overlapping portions of the strap loop and the loop to be finally severed from the source of strapping.

The coil tightening apparatus which has been schematically illustrated in FIGS. 1 and 3 to 6 inclusive and the essential elements of which have been briefly outlined above is illustrated in greater detail in FIGS. 2 and 7 to 11 inclusive. As schematically shown in FIG. 1, the strapping machine 12 is supported on a pair of guide rods 40 which are slidable horizontally in guides 42 carried by a platform 44 which, in turn, is slidable vertically on a supporting post 46 in the vicinity of the strapping station SS. Vertical movement is imparted to the platform 44 from a reversible pneumatic motor M1 (see also FIG. 11) through a power train 48 of the chain and sprocket type whereby the strapping machine 12 may be shifted vertically between its elevated and lowered positions as shown in dotted and full lines respectively.

Figure 2:
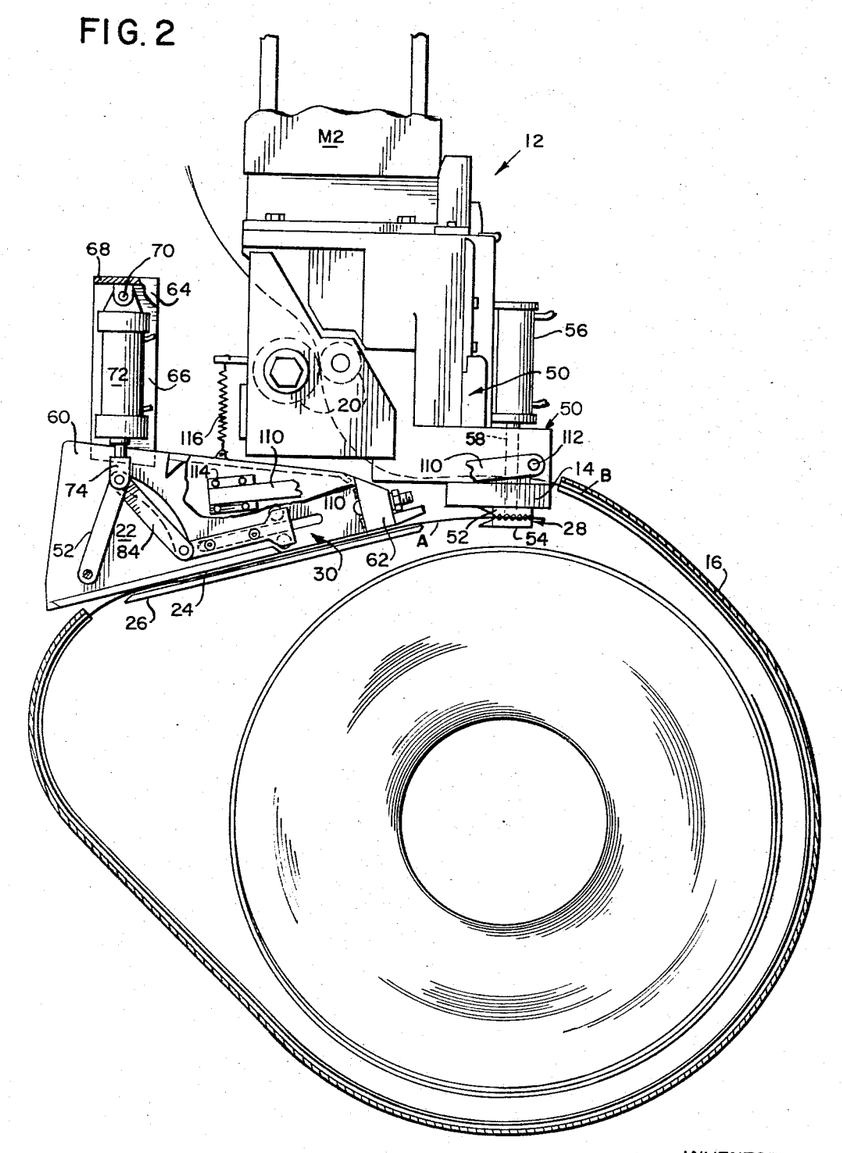
FIG. 2 is an enlarged fragmentary plan view of the strapping machine proper associated with the apparatus of FIG. 1 and showing the same operatively positioned with respect to a coil to be tightened and strapped, the machine being shown in the condition which it assumes at approximately 60° in the machine cycle and after an initial strap-feeding operation for coil-encircling purposes has taken place. In this view certain portions of the machine have been broken away and certain gate-actuating instrumentalities removed in the interests of clarity.

As best seen in FIG. 2, the strapping machine 12 involves in its general organization a framework 50 on which the previously mentioned strap-clamping jaws 28 are mounted. These jaws include a fixed anvil jaw 52 (see also FIG. 11) and a movable clamping jaw 54, the latter being movable into and out of clamping engagement with the fixed jaw under the influence of a pneumatic piston and cylinder assembly 56 having a plunger 58 connected to the movable jaw 54. The reversible feed rollers 20 are rotatably mounted on the framework 50 and are adapted to be driven in the usual manner of feed roller operation through a power train 59 (FIG. 11) extending from a second reversible pneumatic motor M2.

Figures 7, 13:
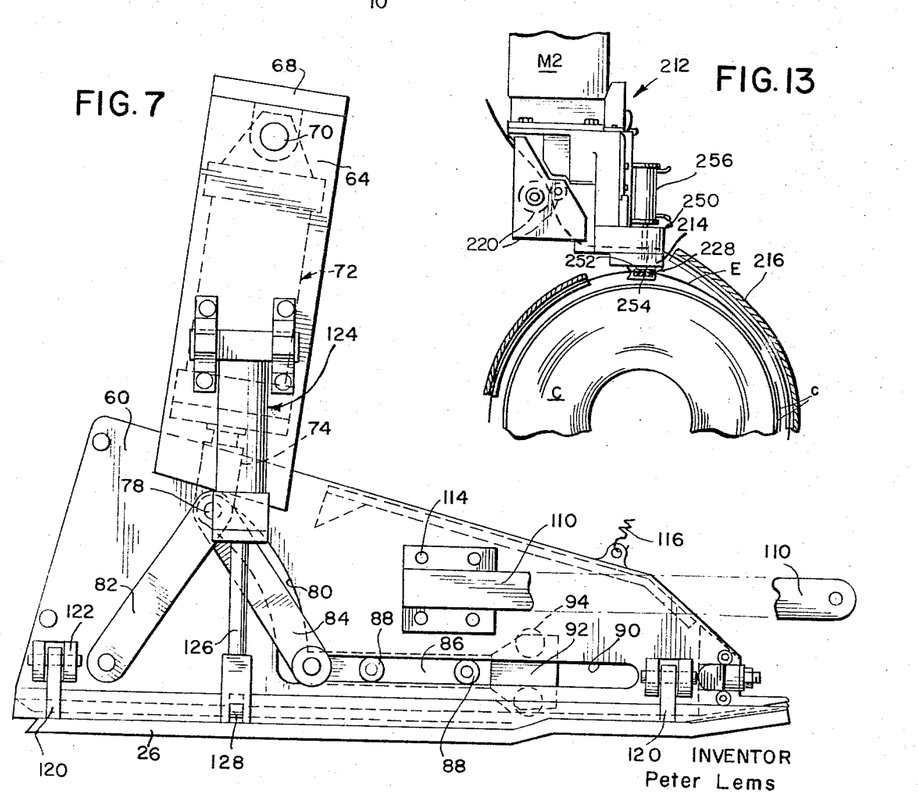
FIG. 7 is an enlarged top plan view of a pivoted movable excess strap-retaining carriage assembly employed in connection with the present invention.
FIG. 13 is a plan view similar to FIG. 2, showing a modified form of coil tightening and strapping apparatus and showing the same in the condition which it assumes after an initial strap feeding operation involving the encircling of the coil with excess strapping material.
Figure 8:
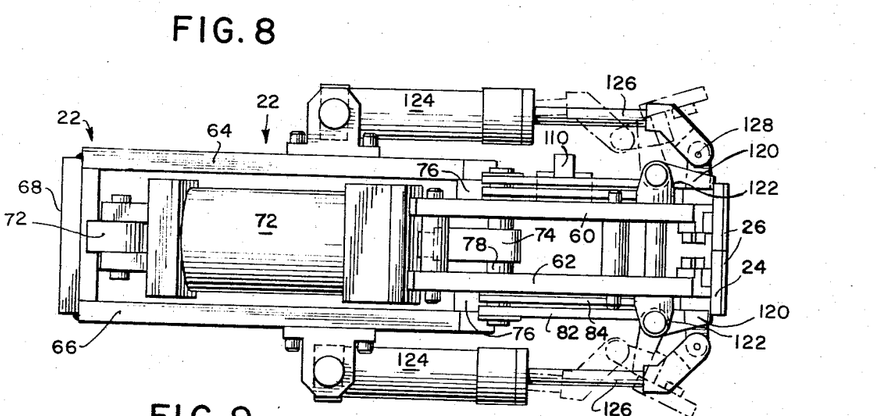
FIG. 8 is an end view of the structure shown in FIG. 7.
Figure 10:
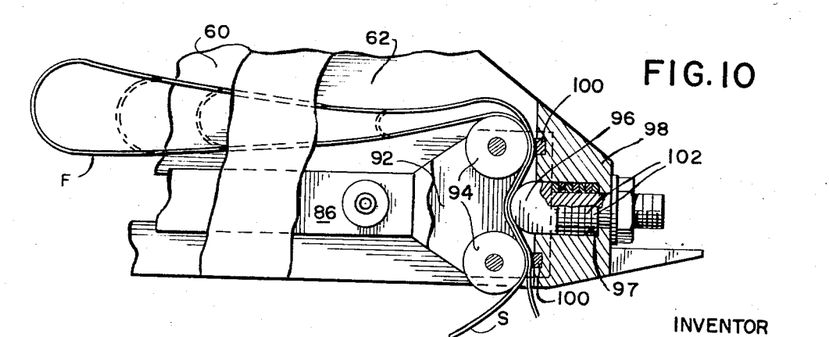
FIG. 10 is an enlarged fragmentary detail view taken in the vicinity of an adjustable gate opening employed in connection with the invention and illustrating, somewhat schematically, a strap-pinching operation which is performed in connection with the method involved.

Still referring to FIG. 2, and in addition to FIGS. 7 and 8, the loop-confining carriage assembly 22 is in the form of a cage-like structure embodying spaced apart top and bottom plates 60 and 62 from which there project laterally top and bottom extension plates 64 and 66 respectively. An end plate 68 extends between two plates 60 and 62 and carries a pivotal mounting 70 for a horizontally disposed pneumatic piston and cylinder assembly 72 including a plunger 74. The inner ends of the plates 64 straddle the plates 60 and 62 and are spaced therefrom by spacer blocks 76. The plunger 74 carries a vertical cross pin 78 which projects through arcuate slots 80 in the plates 60 and 62 and which is pivoted at its opposite ends to respective pairs of spreader links 82 and 84 above and below the cage-like structure 22 respectively. The free ends of the links 82 are pivotally secured to the plates 60 and 62 while the free ends of the links 84 are secured to one end of an elongated movable gate member 86 (see also FIG. 10) forming an element of the aforementioned gate structure 30 and which is longitudinally slidable between the two plates 60 and 62 as best seen in FIG. 7. Guide rollers 88 are carried by the gate member 86 and project into guide slots 90 in the plates 60 and 62, thus constraining the gate member 82 to reciprocate in a straight linear path. The free end of the gate member 86 is provided with an enlarged head 92 which carries a pair of spaced apart friction rollers 94 (see also FIG. 10) designed for cooperation with a fixed gate member 96 in the form of a friction finger secured in a socket 97 provided in a block 98 which extends between the plates 60 and 62 near the inner end of the carriage. The gate member 86 is movable between the retracted position in which it is shown in FIG. 2 and the advanced position wherein it is shown in FIG. 10. In its retracted position the gate structure 30 affords a relatively wide gate opening through which the strapping of the loop which is established in the elevated chute 16 as previously described may be forced to provide the fold F. In its advanced position, the gate opening is closed and the friction finger 96 projects partially between the two rollers 94 so as to pinch the base portion of the fold F closed and establish friction contact between the two thicknesses of strapping material during the tensioning operation. The thickness of strapping material which is next adjacent to the friction finger 96 is restrained against pulling out of the confines of the cage-like carriage 22 by means of a pair of friction inserts 100 provided in the block 98 and which present serrated friction surfaces to the adjacent thickness of strapping material. The thickness of strapping material which is remote from the friction finger 96 is thus free to slide upon the other thickness of material during the tensioning operation to withdraw material from the fold F and apply the same to the coil as previously described. Opening and closing movements of the gate structure are effected under the control of the piston and cylinder assembly 72 which, when the plunger 74 is extended effects a spreading action of the links 82 and 84 and forces the gate member 86 toward the fixed gate member 96. The frictional retardation of the strapping of the fold F offered by the gate structure 30 during withdrawal of the strapping as previously described may be varied by means of a series of backup washers 102 which are disposed in the socket 97 and which may be increased or decreased in number as desired.

The entire cage-like carriage assembly 22 is pivotally mounted on the strapping machine framework 50 by means of a supporting arm 110 (FIGS. 2 and 8) which is pivoted at its proximate end as at 112 to the framework 50 and the distal end of which is bolted as at 114 to the top plate 60. The assembly 22 is thus capable of swinging movement in a horizontal plane toward and away from the coil C undergoing tightening at the strapping station SS when the platform 44 is in its lowered position. The carriage assembly 22 may be normally biased by means of a spring 116 to its retracted position remote from the coil, one end of the spring being secured to the carriage assembly and the other end thereof secured to the strapping machine framework 50.

Figure 9:
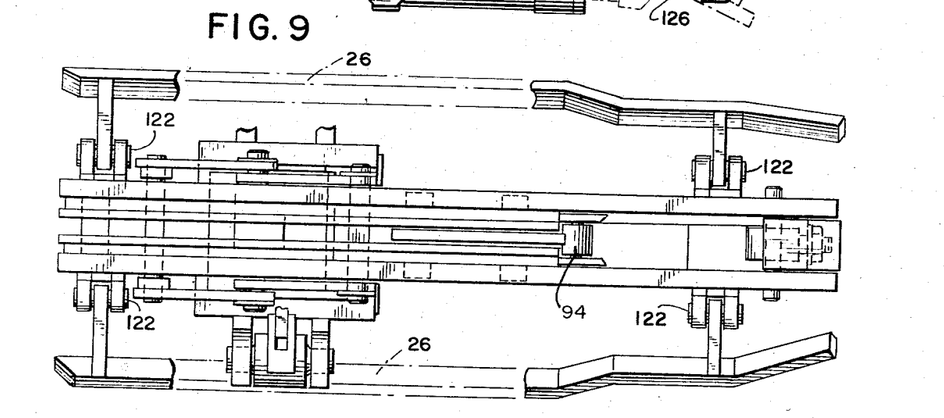
FIG. 9 is a fragmentary end elevational view of the structure shown in FIG. 8 but with the parts in a different position.

The dual clamshell gates 26 which establish the guideway 24 for the initial passage of strapping material toward the clamping jaws 28, together with the actuating mechanism therefor, are best illustrated in FIGS. 7 to 9 inclusive. The two gates 26 and their respective actuating mechanisms are substantially identical and therefore a description of one of them will suffice for the other. As shown in FIG. 8, the upper gate 26 is supported on a pair of arms 120 which are pivotally supported from the top plate 60 by means of pivot mountings 122 at spaced regions therealong and it is movable between the open and closed gate positions shown in dotted and full lines respectively in FIG. 8 by means of a piston and cylinder assembly 124 having a plunger 126 the distal end of which is effectively pivoted as at 128 to the gate. In the extended position of the plunger 126, the gate assumes its full line closed position wherein it extends vertically alongside the carriage 22 and establishes the guidway 24. In the retracted position of the plunger 126, the gate assumes the dotted line position wherein it overlies the top plate 60 and is thus in an out-of-the-way position with respect to the loop of strapping at the commencement of the strap tensioning operation so that it will not interfere with the shrinking of such loop upon the coil. The two clamshell gates 26, when in their closed positions, perform the dual functions of establishing the guideway 24 for initial strap feeding purposes, and of establishing a wall or shield directly in front of the gate opening afforded by the friction gate structure 30 so that the strapping material will be constrained to enter the gate opening and collect within the confines of the cage-like carriage assembly 22 during continued feeding of the strapping after the free end region F thereof has been engaged by the clamping jaws 28. The space which exists within the confines of the carriage assembly 22 thus, in effect, establishes a reservoir for the excess strapping afforded by the fold F and, during the tensioning operation, the excess strapping is progressively withdrawn from such reservoir for coil tightening purposes as previously described.

Figure 11:
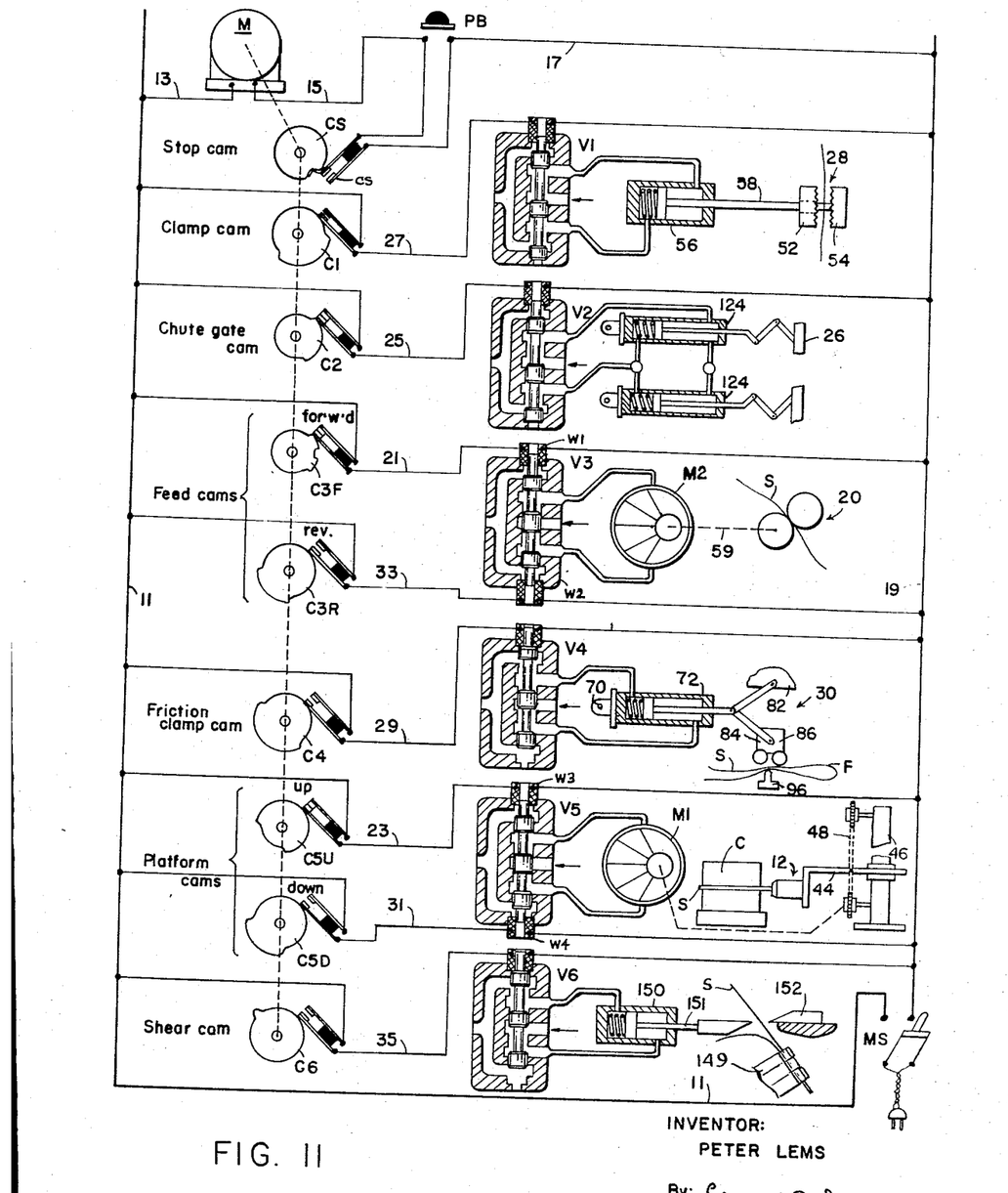
FIG. 11 is a diagrammatic view illustrating schematically the operation of the various cam-controlled pneumatic and electric instrumentalities employed in connection with the present invention.

The coil-tightening and strapping apparatus of the present invention is cyclic in its operation. The electrical and pneumatic operating instrumentalities associated with the apparatus are schematically illustrated in FIG. 11 and this view, when considered in conjunction with the timing chart of FIG. 12, will afford an understanding of the operation of the apparatus during a full machine cycle involving the tightening and strapping of a coil such as the coil C at the strapping station SS. Considering FIGS. 11 and 12 in conjunction with each other, the cylinder 56 which controls the actuation of the cooperating clamping jaw assembly 28 is adapted to be operated under the control of a solenoid-actuated valve V1 which, in turn, is energized under the control of a clamp cam C1. The cylinders 124 which control the actuation of the two clamshell gates 26 are adapted to be operated under the control of a similar valve V2 which, in turn is energized by means of a gate cam C2. The reversible pneumatic feed wheel motor M2 is operable under the control of a dual-solenoid actuated valve V3 having solenoid windings $w1$ and $w2$ capable of being selectively energized under the control of a pair of feed cams C3F and C3R respectively. The cylinder 72 which controls the opening and closing movements of the strap-reservoir gate structure 30 is operable under the control of a valve V4 and an associated cam C4. The reversible platform motor M1 is operable under the control of a dual-solenoid valve V5 having windings $w3$ and $w4$ which are capable of selective energization by cam C5U and C5D respectively.

A sixth solenoid-actuated valve V6 controls the operation of a piston and cylinder assembly 150 operatively connected by a plunger 151 to a seal-applying and crimping device 149, and a strap-shearing device 152, both of which are operable under the control of a cam C6. The strap-shearing device 152 is disposed in the immediate vicinity of the overlapping feed and free end portions of the strap loop and it is effective to shear the fully tensioned and sealed loop from the source of strapping material at the end of the machine cycle when the coil has been fully tightened. It will be understood of course that the strapping machine 12 has associated therewith suitable seal-applying and crimping mechanism by means of which, after the coil-tightening and strap-tensioning operations have been completed, a seal is applied to the overlapping regions of the strap loop and is crimped about these regions immediately prior to the severing operation.

Figure 12:
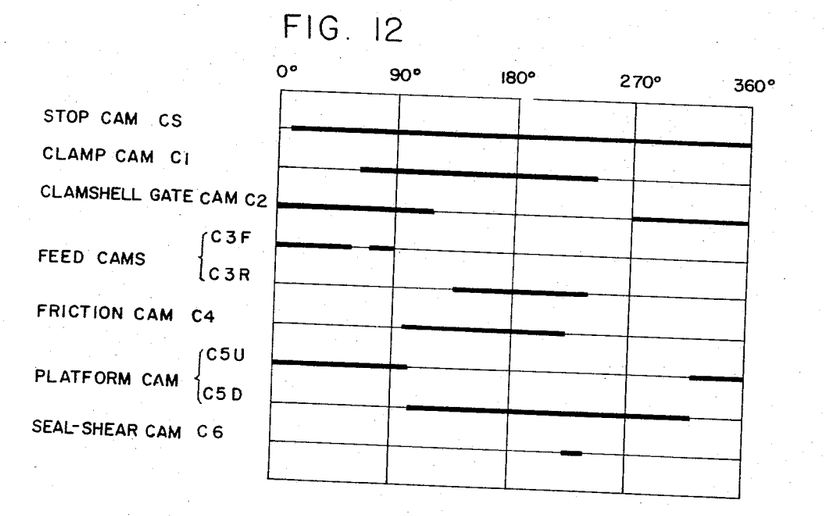
FIG. 12 is a timing chart illustrating the cyclic operation of the control cams shown in FIG. 11.

Considering now the cyclic operation of the apparatus in detail, and still referring to FIGS. 11 and 12, after a coil such as the coil C has been positioned at the strapping station SS, closure of the master switch MS and depression of the push button PB establishes a circuit for the electric motor M, the circuit extending from the source S which may be an outlet leading from a commercial power line, from the positive side of the line 11 through lead 13, the motor M, lead 15, push button PB, and lead 17 to the negative side of the line 19 and from thence back to the source S. Energization of the motor M serves to effect rotation of the various cams C1 to C6 inclusive, together with a stop cam CS which, upon initial rotation thereof serves to close a pair of associated contacts to establish a bridging circuit across the push button PB and maintain the motor M in operation until the end of the machine cycle.

At the commencement of the machine cycle, the contacts associated with the feed cam C3F are closed so as to establish a circuit through the winding $w1$ of the valve V3, thus energizing the reversible motor M2 in a direction to feed the strapping through the chute 16. This circuit for the winding $w1$ is designated generally by the reference numeral 21. At this time the cam C5U maintains its associated contacts closed so as to maintain a circuit 23 through the winding $w3$ of the valve V5 and cause the pneumatic motor M1 to maintain the platform 44 elevated. Additionally, at this time the cam C2 maintains its associated contacts closed to establish a circuit 25 through the winding of the valve V2, thus causing the retracted plungers 126 to hold both clamshell gates 26 in position across the reservoir gate oepning.

At such time as the free end region A of the strap encounters the clamping jaws 28, and at approximately 45° in the machine cycle, these jaws close upon the strap due to closure of the contacts associated with the clamp cam C1 and the consequent energization of the circuit 27 for the winding of the valve V1. Such energization of the winding actuates the cylinder 56 and maintains the plungers 58 in its retracted jaw closing position. At such time as the clamping jaws 28 become closed, the feed cam C3F allows the associated contacts to open and thus discontinue the strap feed operation for a brief period of time until at approximately 60° in the machine cycle when these contacts again become closed and reestablish the circuit 21 so that further strap feeding operations take place. At this time, the strapping which is fed through the still elevated chute 16 is forced through the gate opening of the reservoir gate structure 30 and, at approximately 90° in the cycle this strap feeding operation is discontinued by closeure of the contacts of the cam C3F.

With the auxiliary loop or fold F now fully formed within the confines of the carriage assembly 22 the cam C4 closes its associated contacts at approximately 95° in the machine cycle to energize the circuit 29 through the winding of the valve V4 and project the plunger 74 of the cylinder 72 and thereby cause the gate members 86 and 96 to close upon the fold F in the manner previously described. With the strap loop now completely established as a closed structure, the platform 44 is caused to descend to pull the closed strap loop forcibly from the chute 16 and position the same about the coil C, descent of the platform being completed at approximately 110° of the cycle and being occasioned by closure of the contacts associated with the cam C5D and consequent energization of the circuit 31 for the winding $w4$ of the valve V5. Energization of this winding causes reverse rotation of the pneumatic motor M1 and consequent lowering of the platform 44. The details of the loop-forming chute 16 have not been disclosed herein since they constitute no part of the present invention. Various chute constructions capable of releasing the loop of strapping upon lowering of the platform 44 are contemplated. As is well known in the art, if desired the strapping may be confined within the chute by yieldable friction means which yields when the platform 44 is lowered, or suitable releasable gates may be employed and their operation correlated with the movement of the platform. One specific means suitable for use in connection with the strap-releasing chute 16 has been disclosed in United States Patent No. 2,215,121, issued to Harvey et al. on Sept. 17, 1940. Irrespective however of the particular strap-releasing chute employed, the essential features of the present coil tightening and strapping apparatus are in no way altered.

Immediately upon descent of the platform 44, the cam C2 causes its associated contacts to open, thus deenergizing the winding for the valve V2 and causing the plungers 126 to be projected from the cylinders 124 to move the clamshell gates to their raised retracted out-of-the-way positions and afford a clearance for subsequent strap shrinkage upon the coil C.

At approximately 120° in the machine cycle, the feed cam C32 closes its associated contacts and energizes the circuit 33 for the winding $w2$ of the valve V3, whereupon the pneumatic motor M2 effects reverse rotation of the feed rollers 20 and the feed end region F2 of the strap loop is pulled in a direction to shrink the strap loop about the coil.

For a short period of time after this reverse feed of the strapping has been initiated, the loose slack in the closed strap loop will be taken up. This initial shrinking of the strap loop upon the coil is represented by the disclosure of the strap loop in FIGS. 3 and 4 and it continues until the strap loop closely hugs the coil as shown in FIG. 5. The duration of this gathering in of the loose strapping is dependant upon the diameter of the particular coil undergoing strapping. However, at such time as the strap loop is sufficiently shrunk that it becomes coextensive with the outermost coil convolution c, the friction which is developed between the strap loop and this coil convolution carries the latter in a coil-tightening direction as previously described in detail and coil-tightening operations commence. During such coil-tightening operation, the excess strapping material is withdrawn from the fold F as previously described and as illustrated in FIG. 5. Also during the tightening operation the free edge e of the coil C will move from the position in which it is shown in FIG. 4 to the position illustrated in FIG. 5.

Figure 6:
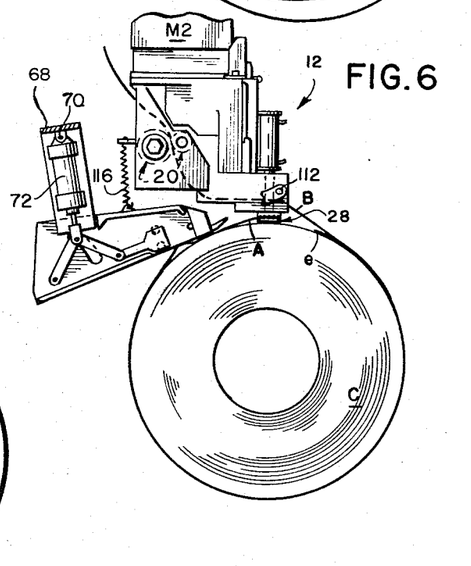
FIG. 6 is a schematic view similar to FIGS. 3 to 5 inclusive, showing the machine at approximately 135° in the machine cycle and in the condition which it assumes after the excess strapping has been substantially assimilated in the coil-encircling loop and final strap tensioning operations upon the now tightened coil are about to commence.

As soon as the coil has been completely tightened such excess strapping material as may remain within the fold F will continue to be withdrawn therefrom and, at approximately 220° in the machine cycle the cam c4 will open its associated contacts to deenergize the circuit 29 and winding of the valve V4, thus opening the gate structure 30 to allow the excess strapping to be completely withdrawn from the confines of the carriage assembly 22 as shown in FIG. 6 whereupon strap tensioning operations continue until the excess strapping is completely dissipated and the full tension exerted by the feed rollers 20 is applied to the strap loop for tightening the loop about the now tightened coil C.

This final strap tensioning operation is a brief one and it terminates at such time as the tension in the loop balances the pulling power of the motor M2, a condition of stall being attained when this occurs. This condition of motor stall may occur at approximately 230° in the machine cycle and shortly thereafter the shear cam C6 causes its contacts to close for a brief period of time to energize the circuit 35 for the winding of the valve V6 and effect seal-applying, seal-crimping and strap shearing operations by projection of the plunger 151.

Upon severing of the strap, the strapping machine 12 is freed from the coil C and the spring 116 (FIG. 2) serves to restore the carriage assembly 22 to its retracted position remote from the coil C. At approximately 270° in the machine cycle the clamshell gates 26 become moved to their closed position under the influence of the cam C2 preparatory to the strap feeding operation in the next succeeding machine cycle. At approximately 315° in the cycle the platform 44 is raised under the influence of the cam C51 to raise the strapping machine 12 into register with the chute 16. The machine cycle is terminated by opening of the contacts cs under the influence of the cam CS and the consequent deenergization of the motor M. The completely tightened coil C with the strap applied thereto may then be removed from the strapping station SS and the apparatus will be in condition for the tightening and strapping of the next succeeding coil arriving at the strapping station.

In FIG. 13 a different form of coil-tightening apparatus for carrying out a variation of the method of the present invention has been illustrated. According to this latter method an initial overfeed of the strapping is resorted to, thus carrying the free end region A of the strapping an appreciable distance beyond the clamping jaws 228 to provide the required reservoir of excess strapping which subsequently is drawn back into the close coil-encircling loop for coil tightening purposes during the initial tensioning operation. This excess strapping which has been designated at E in FIG. 13 thus lies on the side of the clamping jaws 228 remote from the tensioning rollers 220 instead of between the tensioning rollers and the clamping jaws as in the previously described method and apparatus. The clamping jaws 228 are friction jaws and they exert yielding clamping pressure upon the strapping so as to restrain withdrawal of the excess strapping E so that after the coil-encircling loop has been shrunk upon the coil C and the tensioning operation continued, coil-tightening operations will be effected in a manner similar to that previously described in connection with the withdrawal of excess strapping from the auxiliary loop F. The necessary frictional retardation of the excess strapping may be attained by the provision of suitable asbestos or other friction inserts 229 in connection with the clamping jaws 228.

Due to the similarity between the apparatus of FIG. 13 and that of FIG. 2, and in order to avoid needless repetition of description, similar reference numerals but of a higher order have been applied to the corresponding parts as between these two views. It will be understood that the strapping machine 212 of FIG. 13 may be operatively associated with a movable platform such as the platform 44 of FIG. 1 and with a chute 216 which functions in the manner of the chute 16 to initially feed the strapping in an arcuate coil-encircling path when the platform is in its raised position. Thereafter, when the platform is lowered, tensioning operations are effected for coil-tightening and strapping purposes. It will also be understood that the cyclic operation of the apparatus of FIG. 13 may be effected under the control of cam-controlled electric and pneumatic instrumentalities similar to those shown in FIG. 11. It is deemed unnecessary to illustrate such control instrumentalities and the timing chart of FIG. 14 will suffice for a full understanding of the operation of the apparatus. The strapping machine 212 is substantially identical with the strapping machine 12 except for the omission of the entire movable carriage assembly 22 and the substitution of the friction clamping jaws 228 for the positive clamping jaws 28.

Figure 14:
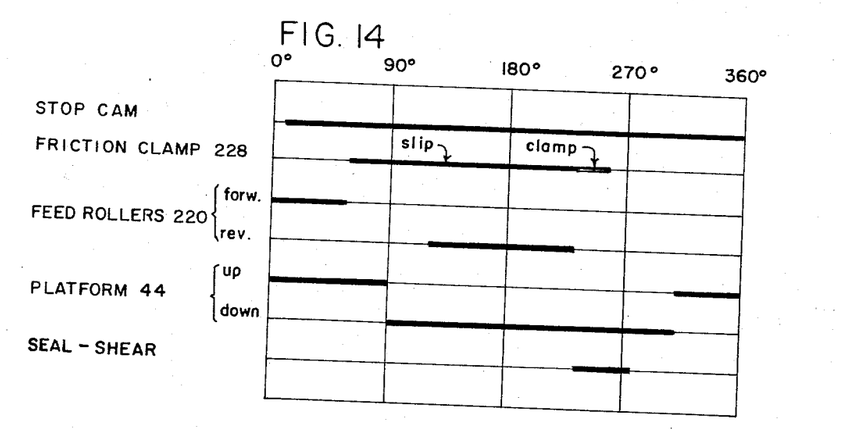
FIG. 14 is a timing chart illustrating the cyclic operation of the strapping apparatus of FIG. 13.

Referring now to the timing chart of FIG. 14, it will be observed that at the commencement of the machine cycle the platform 44 will be in its elevated position and the feed rollers 220 will operate to feed strapping to the chute 216 (FIG. 13) for a period of time slightly longer than in the case of the diagram of FIG. 12 so that the excess strapping E will be fed beyond the friction jaws 228 before these jaws become effective to engage the strapping at approximately 50° in the machine cycle. At approximately 90° in the machine cycle the platform 44 becomes lowered and at approximately 120° the feed rollers 220 reverse their operation to draw the strapping back through the friction jaws 228 and into the closed coil-encircling loop for initial strap-shrinking and subsequent coil tightening purposes as previously described. The friction jaws 228 remain effective to pass the strap back into the coil-encircling loop until approximately 230° in the machine cycle. At this time fluid pressure acting on the clamp 228 (FIG. 13) is increased as indicated by the double line in FIG. 14, thus fixedly clamping the strap against the fixed anvil jaw 252. It may be assumed that at this time the coil convolutions c will have been fully tightened so that immediately upon clamping of the strap further tensioning thereof will operate to apply binding pressure for final coil-strapping purposes. Seal-applying and shearing may then take place immediately prior to clamp-releasing operations and restoration of the platform 44 to its elevated position may take place at approximately 315° in the machine cycle as heretofore described in connection with the apparatus of FIG. 2 and, at the end of the cycle, the stop cam serves to terminate the operation of the apparatus.

While two specific and preferred forms of apparatus by means of which the present coil-tightening method may be carried out have been described herein, it will be understood that these forms do not by any means indicate the only forms suitable for conduction of the method. The forms illustrated herein are only ones which have been developed for commercial application of the method and numerous other forms are contemplated. Therefore, the invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

Having thus described my invention, what I claim and desire to secure by Letters Patent is:

1. In an apparatus for tensioning a loop of strapping about an involutely wound coil of sheet metal while simultaneously tightening the coil convolutions by shifting the outermost convolution circumferentially of the coil in a coil-tightening direction, said loop having a lead end portion and a supply end portion, means in the vicinity of said lead end portion establishing a reservoir for excess strapping, means for applying tension to said supply end portion of the loop to draw the strapping in a coil-tightening direction and shrink the loop about the coil, and means engageable with the strapping for restraining the excess strapping in the reservoir from entering the loop until such time as a predetermined degree of tension has been attained in the loop by said tensioning means, after which such excess strapping will be drawn progressively against the action of said restraining means and into frictional contact with said outermost coil convolution for coil-tightening purposes.

2. In an apparatus for tensioning a loop of loosely positioned strapping about an involutely wound coil of sheet metal while simultaneously tightening the coil convolutions by shifting the outermost convolution circumferentially of the coil in a coil-tightening direction, said loop having a lead end portion and a supply end portion, in combination, a framework adapted to effectively bear against the coil, a strap chute for conducting strapping endwise in an arcuate path to provide said loop of strapping and to conduct the lead end region of the strapping to said framework, reversible means carried by said framework effective in one direction to feed strapping to said strap chute and in the other direction to tension the strapping of the loop and shrink the same about the coil, and a pair of clamping jaws disposd in close proximity to said arcuate path and relatively movable toward and away from each other between closed and open positions respectively, said jaws when in their open position allowing the passage of excess strapping therethrough from said loop during the strap feeding operation, said jaws when in their closed position frictionally engaging the excess strapping and restraining the return flow thereof during the strap tensioning operation.

3. In an apparatus for tensioning a loop of loosely positioned strapping about an involutely wound coil of sheet metal while simultaneously tightening the coil convolutions by shifting the outermost convolution circumferentially of the coil in a coil-tightening direction, said loop having a lead end portion and a supply end portion, means for fixedly clamping said lead end portion of the loop, means for applying tension to said supply end portion of the loop to draw the strapping in a coil-tightening direction and shrink the loop about the coil, and means engageable with the loop at a region intermediate said lead end and supply end portions for restraining the excess strapping of the loop which is disposed between the lead end portion and said intermediate region from entering the remaining portion of the loop until such time as a predetermined degree of tension has been attained in said remaining portion by said tensioning means, after which such excess strapping will be drawn progressively against the action of said restraining means and into frictional contact with said outermost coil convolution for coil-tightening purposes.

4. In an apparatus for tensioning a loop of loosely positioned strapping about an involutely wound coil of sheet metal while simultaneously tightening the coil convolutions by shifting the outermost convolution circumferentially of the coil in a coil-tightening direction, said loop having a lead end portion, a supply end portion, and an auxiliary loop portion in the form of a fold of excess strapping disposed intermediate said lead and supply end portions, in combination, means for fixedly clamping said lead end portion of the loop, means for applying tension to said supply end portion of the loop to draw the strapping in a coil-tightening direction and shrink the loop about the coil, and means engageable with said fold from entering the remaining portion of the loop until such time as a predetermined degree of tension has been attained in said remaining portion by said tensioning means, after which such excess strapping will be drawn progressively past said restraining means and into frictional contact with said outermost coil convolution for coil-tightening purposes.

5. The combination set forth in claim 4, wherein said means for restraining the excess strapping of the fold comprises a pair of releasable clamping jaws designed for frictional clamping engagement with said fold at the base portion thereof to maintain one side of the fold in opposed sliding frictional engagement with the other side thereof during tensioning of the loop.

6. The combination set forth in claim 4, wherein said releasable clamping jaws include first and second jaw members movable relative to each other between closed fold-engaging and open fold-releasing positions, one of said jaws presenting spaced apart strap-engaging surfaces designed for contact with one side of the fold and the other jaw presenting a strap-engaging surface designed for contact with the other side of the fold and adapted when the jaws are in their closed fold-engaging position to project between said spaced apart strap-engaging surfaces and maintain a tortuous path for frictional sliding movement of said one side of the fold.

7. The combination set forth in claim 4, wherein one of said releasable clamping jaws is in the form of a pair of spaced apart rollers designed for contact with one side of the fold and the other jaw is in the form of a strap-engaging finger designed for contact with the other side of the fold and adapted when the jaws are in their closed fold-engaging position to project between said rollers and, in combination therewith, establish a tortuous path for frictional sliding movement of said one side of the fold against said other side thereof.

8. The combination set forth in claim 5 and including, additionally, means whereby the effective length of said friction finger may be varied to vary the extent of projection thereof between said rollers when the jaws are in their closed position.

9. In an apparatus for tensioning a loop of loosely positioned strapping about an involutely wound coil of sheet metal while simultaneously tightening the coil convolutions by shifting the outermost convolution circumferentially of the coil in a coil-tightening direction, said loop having a lead end portion and a supply end portion, in combination, a framework adapted to effectively bear against the coil, a strap chute for conducting strapping endwise in an arcuate path to provide said loop of strapping and to feed the lead end portion of the strapping to said frame, means carried by the framework for clamping said lead end portion, reversible means also carried by the framework effective in one direction to feed strapping to said strap chute and in the other direction to tension the strapping of the loop and shrink the same about the coil, and a pair of clamping jaws disposed in close proximity to said arcuate path between the clamping and strap feeding means and relatively movable toward and away from each other between closed and open positions respectively, said jaws in their open position establishing a gate opening therebetween for the flow of excess strapping therethrough in one direction during the strap feeding operation, said jaws when in their closed position frictionally engaging the excess strapping and restraining the flow thereof in the opposite direction during the strap tensioning operation.

10. In an apparatus for tensioning a loop of loosely positioned strapping about an involutely wound coil of sheet metal while simultaneously tightening the coil convolutions by shifting the outermost convolution circumferentially of the coil in a coil-tightening direction, said loop having a lead end portion and a supply end portion, in combination, a main frame adapted to effectively bear against the coil, a strap chute for conducting strapping endwise in an arcuate path to provide said loop of strapping and to feed the lead end region of the strapping to said frame, means carried by the frame for clamping said lead end portion, reversible means also carried by the frame and effective in one direction to feed strapping to said strap chute and in the other direction to tension the strapping of the loop and shrink the same about the coil, an auxiliary frame freely movable toward and away from said coil, a pair of clamping jaws mounted on said auxiliary frame and relatively movable toward and away from each other between closed and open positions respectively, said jaws in their open position establishing a gate opening therebetween for the flow of excess strapping therethrough in one direction during the strap feeding operation, said jaws when in their closed position frictionally engaging the excess strapping and restraining the flow thereof in the opposite direction during the strap tensioning operation whereby the tension progressively applied to the strapping of the loop will initially draw said auxiliary frame effectively against the coil and thereafter draw the excess strapping progressively between said jaws in said opposite direction.

11. The combination set forth in claim 10, wherein said auxiliary frame is pivoted to the main frame for swinging movements toward and away from the latter.

12. In an apparatus for tensioning a loop of strapping about an involutely wound coil of sheet metal vertically positioned at a strapping station while simultaneously tightening the coil convolutions by shifting the outermost convolution circumferentially of the coil in a coil-tightening direction, said loop having a lead end portion and a supply end portion, in combination, a strap chute disposed in an elevated position above the level of the strapping station and adapted to conduct strapping in an arcuate path to provide said loop, a strapping machine including a main frame and movable bodily vertically between a lowered position at the strapping station and an elevated position wherein said main frame is in register with the terminal end of the chute to receive strapping therefrom, means carried by the frame for clamping the lead end of the strapping, reversible means also carried by the frame and effective in one direction to feed strapping to said strap chute when the machine is in its elevated position and in the other direction to tension the strapping of the loop and shrink the same about the coil when the machine is in its lowered position an auxiliary frame movably mounted on the main frame and independently movable toward and away from the axis of the coil a pair of clamping jaws mounted on said auxiliary frame and relatively movable toward and away from each other between closed and open positions respectively, said jaws in their open position establishing a gate opening therebetween for the flow of excess strapping therethrough in one direction during the strap feeding operation, said jaws when in their closed position frictionally engaging the excess strapping and restraining the flow thereof in the opposite direction during the strap tensioning operation whereby the tension progressively applied to the strapping of the loop will initially draw said auxiliary frame effectively against the coil and thereafter draw the excess strapping progressively between said jaws in said opposite direction.

13. The method of tightening the coil convolutions of an involutely wound coil of sheet metal by shifting the outermost convolution circumferentially of the coil in a coil-tightening direction which comprises: loosely encircling the coil with a band of flexible material to provide a substantially closed loop having inner and outer overlapping end portions of substantial length, and drawing the outer overlapping end portion in a coil-tightening direction to shrink the loop upon the coil and draw the excess strapping represented by the inner overlapping portion progressively into the loop, while simultaneously restraining such excess portion from entering the loop.

14. The method of tightening the coil convolution of an involutely wound coil of sheet metal by shifting the outermost convolution circumferentially of the coil in a coil-tightening direction which comprises: loosely encircling the coil with a band of flexible material to provide a substantially closed loop having overlapping end portions and an auxiliary fold of excess material intermediate said end portions, drawing one of said end portions in a coil-tightening direction to shrink the closed loop upon the coil and draw the excess material of the auxiliary fold progressively into the closed loop while simultaneously restraining said excess material from entering the closed loop.

15. The method of tightening the coil convolutions of an involutely wound coil of sheet metal by shifting the outermost convolution circumferentially of the coil in a coil-tightening direction which comprises encircling the coil with a band of flexible material to provide a substantially closed loop having overlapping end portions and an auxiliary fold of excess material intermediate said end portions, fixedly clamping one of said end portions against circumferential shifting and thereafter drawing the other end portion in a coil-tightening direction to shrink the closed loop upon the coil and draw the excess material of the auxiliary fold progressively into the closed loop while simultaneously frictionally restraining said excess portion from entering the closed loop.

16. The method of tightening and strapping an involutely wound coil of sheet metal having loose outer coil convolutions which comprises: encircling the coil with a length of strapping material to provide a substantially closed loop having overlapping end portions and an auxiliary fold of excess strapping intermediate said end portions, drawing one of said end portions in a coil-tightening direction to shrink the closed loop upon the coil and draw the excess strapping of the auxiliary fold progressively into the closed loop while simultaneously frictionally restraining said excess strapping from entering the closed loop until such time as all of the excess strapping has been drawn into the closed loop, continuing the drawing of said one end portion in a coil tightening direction to fully tighten the closed loop about the coil, fixedly securing said end portions together, and finally severing said one end portion of the loop from the remainder thereof.

References Cited by the Examiner

UNITED STATES PATENTS

| 3,019,577 | 2/1962 | Slamar et al. | |
| 3,044,729 | 7/1962 | Prellwitz | 242—78.1 |
| 3,179,037 | 4/1965 | Cranston, et al. | 100—4 |
| 3,216,346 | 11/1965 | Cruckshank et al. | 100—4 |
| 3,238,864 | 3/1966 | Patterson | 100—3 |
| 3,252,408 | 5/1966 | Winkler | 100—26 |

BILLY J. WILHITE, *Primary Examiner.*